United States Patent [19]

Apostolos et al.

[11] Patent Number: 4,633,257
[45] Date of Patent: Dec. 30, 1986

[54] ACQUISITION SYSTEM EMPLOYING CIRCULAR ARRAY

[75] Inventors: John T. Apostolos, Merrimack, N.H.; Robert P. Boland, Wilmington, Mass.; Chester E. Stromswold, Nashua, N.H.

[73] Assignee: Sanders Associates, Inc., Nashua, N.H.

[21] Appl. No.: 551,664

[22] Filed: Nov. 14, 1983

[51] Int. Cl.$^4$ ............................ G01S 5/04; G01S 3/16; G06G 7/19
[52] U.S. Cl. ..................................... 342/445; 364/829; 364/726; 364/516; 324/77 B; 342/378; 342/196
[58] Field of Search ...................... 343/5 FT, 378, 417, 343/443, 445, 5 SA; 324/77 B; 364/576, 725, 726, 827

Primary Examiner—Theodore M. Blum
Assistant Examiner—Gregory C. Issing
Attorney, Agent, or Firm—Louis Etlinger; Stanton D. Weinstein

[57] ABSTRACT

A system for indicating the direction of a source of radio waves received by a circular antenna array (12) includes a Butler matrix (18) that receives the array outputs and feeds the resultant matrix outputs to correction circuits (22) whose transfer functions are the inverses of the direction-independent factors of antenna patterns generated by antenna elements driven at relative phases that advance around the array at rates that complete an integral number of cycles in one circuit of the array. The resultant corrected signals are fed to a compressive receiver (26), which accordingly generates an output on an output port whose position indicates the direction of the source of the signal.

8 Claims, 4 Drawing Figures

ACQUISITION SYSTEM EMPLOYING CIRCULAR ARRAY

BACKGROUND OF THE INVENTION

The present invention is directed to direction-finding antenna systems. It is directed particularly to systems employing circular arrays of antenna elements in which signals from several sources are to be monitored simultaneously.

A powerful device that has been proposed for use in systems for electromagnetic surveillance is the two-dimensional compressive receiver. The two-dimensional compressive receiver performs a two-dimensional Fourier transformation in time and one spatial dimension. Typically, the outputs of a linear array of antenna elements—i.e., of an array in which the elements are disposed on a line—are applied to the input ports of the two-dimensional compressive receiver, and the two-dimensional compressive receiver generates signals at a plurality of output ports. The compressive receiver generates a complete set of outputs within each sweep of the compressive receiver's chirped local oscillator period. Signals of a single frequency are compressed in time, and the time during a sweep at which a time-compressed output occurs indicates the temporal frequency of the antenna signal that gave rise to it. The output port from which the signal issues indicates the spatial-frequency component at the antenna caused by the signals from that source.

Spatial frequency is the rate of phase progression of signals from a given source with respect to position along the antenna array; if the direction of the source forms a large angle with the normal to a linear array and the temporal frequency of the signal is high, then its spatial frequency will be high. On the other hand, small angles and low temporal frequencies result in low spatial frequencies. The angle of the source is indicated by the ratio of the spatial frequency of a component to its temporal frequency.

It is thus apparent that the two-dimensional compressive receiver can identify the temporal frequencies and directions of many signal sources simultaneously.

This simple relationship between direction, spatial frequency and temporal frequency only is obtained, however, if the antenna array is linear, so the two-dimensional compressive receiver indicates the direction of the source readily only if the array is linear. However, it is sometimes desirable to employ circular arrays of antenna elements, and it would be beneficial to obtain the powerful processing abilities of the two-dimensional compressive receiver in a system employing a circular array. To do so is an object of the present invention.

It is a further object of the present invention to provide the direction information in a manner that is independent of temporal frequency so that the direction indication can be generated not only by two-dimensional transform devices but also by devices for performing one-dimensional spatial Fourier transformations.

SUMMARY OF THE INVENTION

The foregoing and related objects are achieved in a direction-finding system that employs a circular array of antenna elements, a device, such as a two-dimensional compressive receiver, for performing a spatial Fourier transformation, and a circuit between the array and the receiver for transforming the output of the circular array to a signal ensemble whose contribution from a given signal source has a spatial frequency that is proportional to the bearing angle of the source.

This circuit includes a spatial-Fourier-transform circuit and correction networks. The Fourier-transform circuit performs a spatial Fourier transformation on the signal ensemble from the array and applies the outputs to the correction networks, whose transfer functions are derived from antenna patterns of the circular array in a manner that will be described in more detail below.

The spatial-frequency components of the resulting ensemble depend only on the directions of the signal sources, not on their temporal frequencies. The second spatial-Fourier-transform device (typically a two-dimensional compressive receiver) receives the outputs of the correction networks and processes them as though they were the outputs of a linear array of antenna elements, but the directions indicated by the output-port positions do not have to be adjusted according to temporal frequency.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
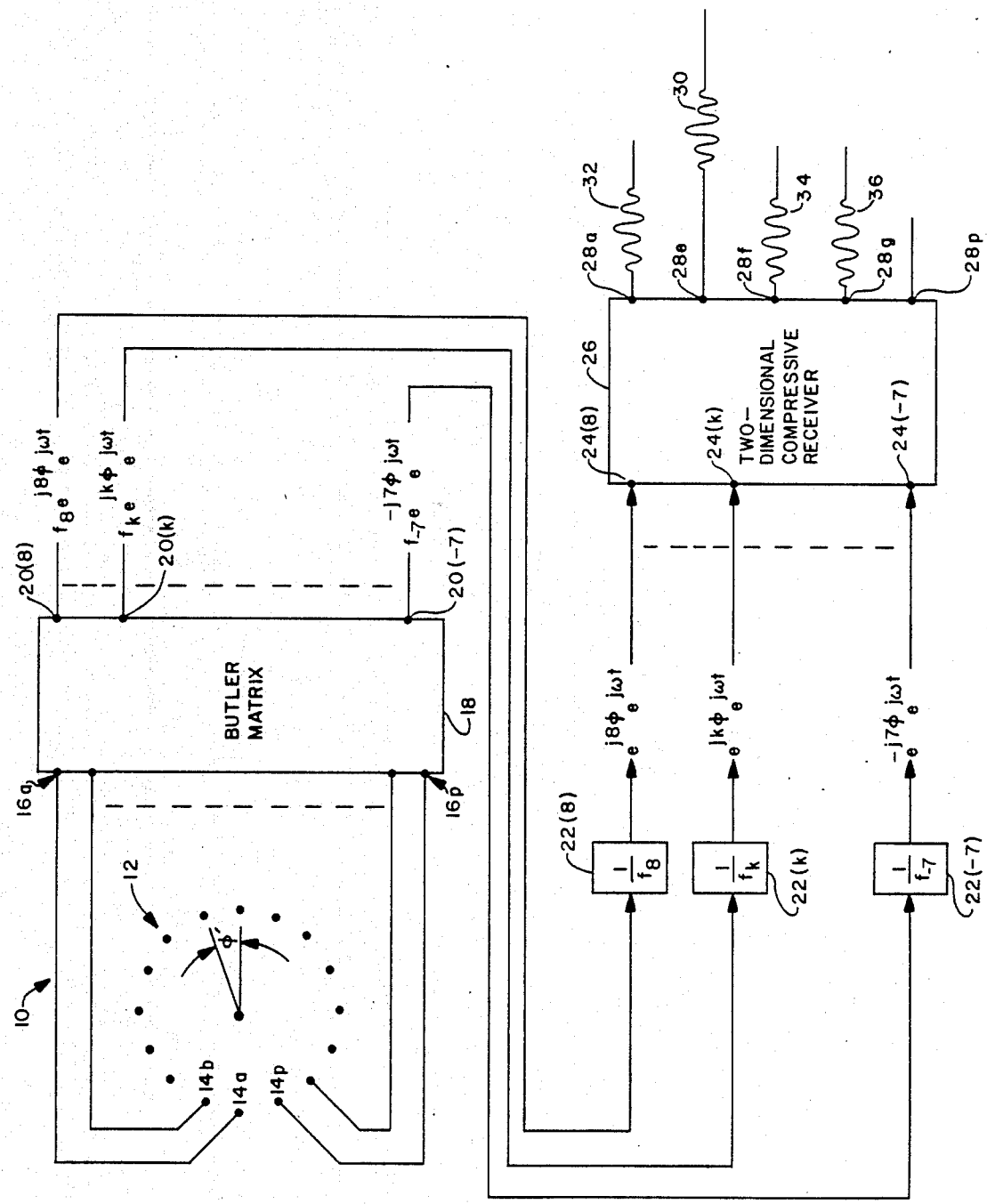
FIG. 1 is a block diagram illustrating the direction-finding system of the present invention.

FIG. 1 illustrates an antenna system 10 that includes a circular array 12 consisting of antenna elements 14a–14p. Each of the antenna elements 14a–14p receives isotropically from sources in the plane of the array 12. The system of FIG. 1 includes circuits that process the outputs of these elements to derive signals that, when applied to a two-dimensional compressive receiver 26, result in receiver outputs that indicate the direction of the sources of the signals.

For the sake of simplicity, the circular array is illustrated and described as a simple circular arrangement of antenna elements with no backscreen or concentric elements. For broadband systems, the simple circular array is not as advantageous as some others, whose antenna patterns can be accommodated more readily by correction circuits in the system. Nonetheless, the device will initially be described in connection with the simple array, and the means for modifying the antenna pattern to achieve a broadband system will be readily apparent once the principle has been described in connection with the simple array.

Each antenna element feeds its output, possibly through a bandpass filter or mixer not shown in the drawings, to a corresponding one of the input terminals 16a–16p of a modified Butler matrix 18. The output terminals 20(−7)–20(−8) of the Butler matrix receive combinations of phase-shifted versions of the signals from the input terminals 16a–16p in such a manner that the output port receiving the largest signal is determined by the spatial frequency—i.e., by the phase advance at a given instant—along the intput terminals 16a–16p of the Butler matrix 18.

Specifically, for a given output terminal 20 of the Butler matrix 18, there is an associated spatial frequency that results in focusing of all of the power in the associated spatial-frequency component to the given output terminal, to the exclusion of all of the other output terminals. The relationship between input spatial frequency and the associated output port is such that input spatial frequency progresses from a large negative value at output port 20(−7) to a large positive value at port 20(8). Thus, by observing the position of a maximum, one can infer the input-port spatial-frequency component that gave rise to it.

In general, there may be many spatial-frequency components at the input ports. The ensemble of signals at the output ports 20 represents an approximation to a spatial Fourier transformation of the signal ensemble at the input ports 16.

In the conventional Butler matrix, the two adjacent central output ports represent opposite phase gradients, or spatial frequencies, of the same magnitude, and the other output ports represent spatial frequencies that are odd harmonics of these spatial frequencies. That is, the difference in the spatial frequencies represented by two adjacent output ports is equal to twice the spatial frequency represented by one of the central output ports. The Butler matrix 18 of the illustrated embodiment is modified so that a central output port 20(0) represents a spatial frequency of zero; that is, the spatial frequency represented by each output port differs from the corresponding spatial frequency for a conventional Butler matrix by half the spatial-frequency spacing of the output ports. This can be accomplished in a number of ways. The most straightforward conceptually is to provide phase shifters (not shown in the drawings) at the input ports 16a–16p with phase shifts that progress along the input ports 16a–16p to represent a spatial frequency of one-half the spatial-frequency spacing of the output ports 20.

For a single single-frequency source, the result of the Fourier transformation performed by the Butler matrix 18 is an output at each output port 20 that is a product of two factors. The first factor is determined by the spatial frequency associated with the particular output port, the arrangements of the elements 14 of the array 12, and the temporal frequency of the received signal; it is independent of the bearing of the signal source. For the kth output port 20(k), this factor is indicated in FIG. 1 as $f_k$. The second factor is merely $e^{jk\Phi}$. (A third factor, $e^{j\omega t}$, will merely be implied in the rest of the discussion.)

The output of each port 20(k) is fed to an associated correction network 22(k), which is the inverse function of the direction-independent factor $f_k$. The resulting outputs of the correction networks 22(−7)–22(8) is an ensemble of signals having a linear relationship of relative phase to position such that the phase gradient is determined exclusively by the angle of the direction of the source. These signals are fed to corresponding input ports 24(−7)–24(8) of the two-dimensional compressive receiver 26. As those skilled in the art will recognize, the two-dimensional compressive receiver 26 typically includes a dispersive delay line with a linear delay-frequency relationship. It also includes chirped mixers, frequency- and position-weighting networks and other elements ordinarily employed to obtain the desired temporal- and spatial-frequency discrimination. Together they perform a two-dimensional Fourier transformation of the input signal ensemble in space and time and produce an output at the one of output terminals 28a–28p that corresponds to the spatial frequency of its input-signal ensemble. Since the spatial frequency of the input-signal ensemble is determined exclusively by the angle of the source, the position of the output terminal 28 at which the maximum signal from a given source occurs indicates the direction of that source.

In practice, of course, the phase relationship among the signals at the input ports 24 of the two-dimensional compressive receiver 26 is not linear; it will carry signals from many sources, so there will be many spatial-frequency components. This fact is illustrated in FIG. 1, which indicates several output-signal portions 30, 32, 34, and 36. Signal portion 30 occurs on line 28e relatively late in a sweep of the compressive receiver 26. Output port 28e may, for example, represent a bearing of 112.5°, and the time at which the signal portion 30 occurs may indicate a relatively high frequency. Signal portion 32 occurs earlier, so it represents a lower frequency. Its presence on output port 28a may indicate a bearing of, for instance, 22.5°.

Signal portions 34 and 36 occur simultaneously on adjacent output ports 28f and 28g and are of lower amplitudes than portions 30 and 32. Together, they indicate a signal source whose direction is somewhere between the bearings of 135° and 147.5° indicated by those two output ports. Since they occur very early in the sweep, they represent frequencies at the low end of the system's frequency range.

Accordingly, the device illustrated in FIG. 1 enables the two-dimensional compressive receiver 26 to indicate source bearing even though the inputs originate in a circular antenna array 12 rather than a linear array. In fact, the direction indication is even more straightforward than for a linear array, because the output port in the system of FIG. 1 actually indicates bearing directly; it does not just indicate a spatial frequency that has to be divided by the temporal frequency before the bearing can be determined.

We will now turn to the values of the $f_k$'s whose inverse functions are implemented by the correction networks 22(−7)–22(8). As was indicated above, the Butler matrix 18 performs a spatial Fourier transformation on the signal ensemble at its input ports 16a–16p. In the following discussion, the array 12 will be treated as a continuous array, rather than an array of discrete elements 14a–14p. This results in a close approximation so long as the inter-element spacing is small in comparison with the wavelength of the received signal.

It will be recalled that the formula for the temporal Fourier coefficients of a periodic signal is as follows:

$$C_k = \int_{-T/2}^{T/2} \epsilon^{-j\frac{2\pi kt}{T}} E(t) dt \qquad (1)$$

The corresponding formula for spatial Fourier coefficients for signals distributed around a circular array is $$C_k = \int_{-\pi}^{\pi} e^{jk\Phi'} E(\Phi') d\Phi' \qquad (2)$$

In this case, $E(\Phi')$ is the instantaneous value of the signal on the antenna at a position defined by angle $\Phi'$.

The coefficient $c_k$ for the kth Butler-matrix output port is equal to $f_k e^{jk\Phi}$, where $\Phi$ is the bearing angle of the source. Thus, in order to determine the $f_k$'s, it is only necesary to evaluate $c_k$.

Figure 2:
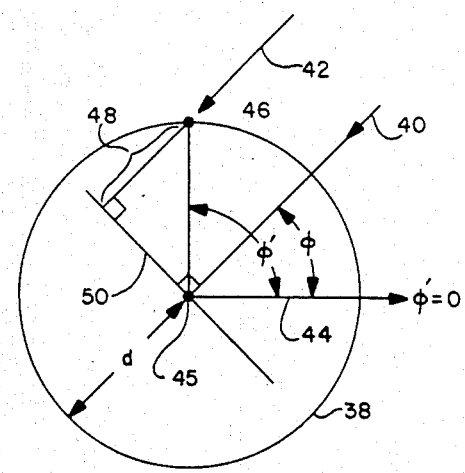
FIG. 2 is a diagram illustrating the geometry for calculating an antenna pattern for the FIG. 1 array.

The evaluation will be made in connection with FIG. 2. In FIG. 2, a circle 38 represents a continuous linear array approximated by the discrete array 12. A plane wave propagates along a direction of travel 40 at an angle $\Phi$ with respect to an arbitrary reference direction 44. A plane wave is assumed because the source is assumed to be a large distance from the array. To determine the phase, relative to the center of the array 45, of the signal at a given element position 46 at an angle $\Phi'$, one determines the perpendicular distance 48 between the element 46 and the normal 50 to the direction of propagation 40 through the center 45. If the radius of the circular array is d, then the distance 48 is equal to d cos $(\Phi' - \Phi)$. Accordingly, the value of the signal at position $\Phi'$ is given by:

$$E(\Phi') = e^{j\beta d \cos(\Phi' - \Phi)} \qquad (3)$$

where $\beta$ equals $\omega$ divided by the speed of light.
Substituting (3) into (2) results in:

$$C_k = \int_{-\pi}^{\pi} e^{jk\Phi'} e^{j\beta d \cos(\Phi' - \Phi)} d\Phi' \qquad (4)$$

In order to evaluate this integral, we employ Hansen's integral formula for an mth-order Bessel function of the first kind:

$$J_m(z) = \frac{1}{2\pi} \int_{-\pi}^{\pi} e^{jz\cos t} e^{jm(t - \pi/2)} dt \qquad (5)$$

To rearrange equation (4) to a form more similar to Hansen's formula, we make the substitution $\Phi'' = \Phi' - \Phi$ and obtain $$C_k = \int_{\Phi - \pi}^{\Phi + \pi} e^{j\beta d \cos\Phi''} e^{jk(\Phi'' + \Phi)} d\Phi \qquad (6)$$

But, recognizing the periodicity of the expression to be integrated, we can shift the limits of integration without changing the integrand. Moving some constants outside of the integral then results in $$C_k = 2\pi e^{-jk\pi/2} e^{jk\Phi} \frac{1}{2\pi} \int_{-\pi}^{\pi} e^{j\beta d \cos\Phi''} e^{jk(\Phi'' - \pi/2)} d\Phi \qquad (7)$$

This allows us to perform the integration in accordance with Hansen's formula:

$$C_k = 2\pi j^k e^{jk\Phi} J_k(\beta d) \qquad (8)$$

As FIG. 1 indicates, the function $f_k$ is defined by:

$$C_k = e^{jk\Phi} f_k \qquad (9)$$

Or, if the frequency dependence is made explicit, $$f_k = 2\pi j^k J_k\left(\frac{d}{c}\omega\right) \qquad (10)$$

where c is the speed of light.

Thus, if a network 22(k) is provided that has a frequency response equal to the reciprocal of $f_k$, then the outputs of the two-dimensional receiver 26 will be an ensemble having a spatial frequency proportional to the bearing angle.

At this point, it may be instructive to put into words what the foregoing mathematics indicates. The physical meaning of the factor $c_k$ is as follows. If the antenna elements are all independently driven at equal amplitudes and at a relative phase of $k\Phi'$, then the signal at a given position $(r, \Phi)$ in the plane of the array 12 is equal to:

$$\text{Re}\{A(r)C_k(\Phi, \omega)e^{j\omega t}\} \qquad (11)$$

for large r, where $A(r)$ is a factor depending on the amplitude of the transmitted signal. $A(r)$ is a constant for a constant-amplitude signal and a constant distance r. That is, $c_k$ is the antenna pattern generated when the phase relationship between the antenna elements progresses at a linear rate that completes k periods in one circuit of the array. The function $f_k$, the inverse of the correction-circuit transfer function, is this antenna pattern without the direction-dependent factor; in other words, it is the antenna pattern divided by $e^{jk\Phi}$.

As was indicated above, the simple circular antenna array illustrated in the drawings was used because its explanation is relatively simple. In some cases, however, its use in the present invention might be impractical. This can be understood if the nature of the $f_k$, as expressed in equation (10), is considered. Specifically, the function set forth in equation (10) goes to zero at certain values of $\omega$. That is, at those frequencies, the value of the transfer function of the correction circuit 22(k) would have to be infinite. Since it is not possible to achieve such a circuit, the output of system 10 would not be accurate in the neighborhoods of those frequencies. In order to avoid this problem, another type of angularly symmetric array, such as the concentric circular array illustrated in FIG. 3, would be preferable. The antenna pattern of this array does not go to zero for any frequency.

Figure 3:
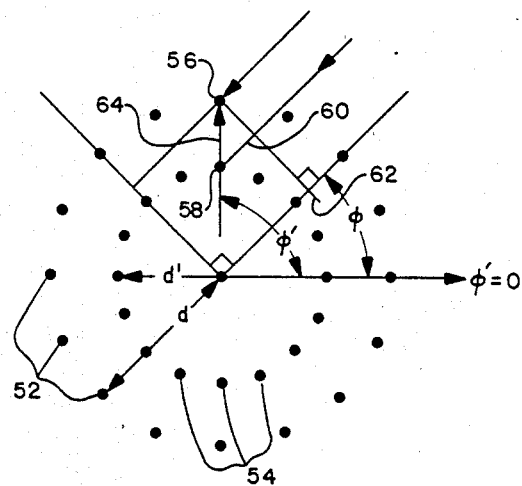
FIG. 3 is a diagram illustrating the geometry for calculating an antenna pattern for a concentric array.

FIG. 3 shows a circular array of antenna elements 52 that are connected to the Butler matrix 18 in the same manner as that in which the array elements 14 of FIG. 1 are connected. Additionally, each element 52 is associated with an inner element 54 positioned at the angular position of the outer element but spaced slightly inward radially. The outer elements 52 are all positioned at a distance d from the center, while the inner elements 54 are all disposed at a distance d'. For the purposes of illustrating the geometry, the distances between the inner and outer elements are exaggerated in FIG. 3; in practice, $d - d'$ will be a very small fraction of d.

Figure 4:
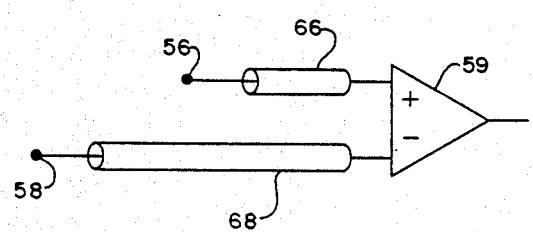
FIG. 4 is a diagram of the circuit for combining signals from associated elements in the array of FIG. 3.

When the array of FIG. 3 is employed, each input port of the Butler matrix 18 of FIG. 1 receives, rather than the signal from a single antenna element, signals from two antenna elements 56 and 58 combined, as illustrated in FIG. 4, in a subtraction circuit 59. We assume that all mutual impedances between elements are zero. Therefore, the signal on a given element 56 of the array of FIG. 3 will be the same as the signal on element 46 of FIG. 2 described in equation (3). The contribution from inner element 58, however, is delayed from that described by equation (3). Part of this delay results from the portion 60 of the signal path to element 58 from the normal 62 to the bearing angle through element 56. (For some bearing angles, this path portion may actually be a phase advance; nonetheless, the contribution from the inner element 58 is always delayed from that from outer element 56.)

A further delay results from the difference between the lengths of the paths from the antenna elements to the amplifier 59. This difference is arranged to make it equal to the distance 64 from the outer element 56 to the inner element 58. Specifically, the difference between the lengths of transmission lines 66 and 68, which connect elements 56 and 58, respectively, to the amplifier 59, is equal to the distance 64 multiplied by the ratio of the transmission-line propagation speed to the speed of light.

Additionally, a further phase change of 180° results from the subtraction of the element 58 signal. Thus, the contribution from element 58 can be expressed as follows:

$$E'(\Phi') = e^{j\beta d \cos(\Phi - \Phi')} e^{-j\beta(d-d')} e^{-j\pi} e^{-j\beta(d-d')\cos(\Phi - \Phi')} \quad (12)$$

Adding the signal components represented by equations (3) and (12) results in the following expression for the total output of circuit 59:

$$E(\Phi') = e^{j\beta d \cos(\Phi - \Phi')}(1 - e^{-j\beta(d-d')[1+\cos(\Phi-\Phi')]}) \quad (13)$$

The arrangement of the array is such that $d - d'$ is much less than a wavelength. Accordingly, we can employ the following approximation given by the first two terms in the Taylor series expansion of the exponential function:

$$e^{-jx} \approx 1 - jx \quad (14)$$

This reduces equation (13) to the following:

$$E(\Phi') = j\beta(d-d')e^{j\beta d \cos(\Phi-\Phi')}[1+\cos(\Phi-\Phi')] \quad (15)$$

The function $f_k$ is therefore given by the following equation:

$$f_k = e^{-jk\Phi} C_k = \quad (16)$$

$$e^{-jk\Phi} \int_{-\pi}^{\pi} e^{jk\Phi'} j\beta(d-d') e^{j\beta d \cos(\Phi'-\Phi)}[1 + \cos(\Phi' - \Phi)] d\Phi'$$

In order to evaluate the integral of equation (16), we differentiate Hansen's integral formula with respect to z:

$$J'_m(z) = \frac{1}{2\pi} \int_{-\pi}^{\pi} j\cos t \, e^{jz\cos t} e^{jm(t-\pi/2)} dt \quad (17)$$

By employing equations (5) and (17) and making the same substitutions as those employed to reach equation (8), we obtain the following expression for $f_k$:

$$f_k = 2\pi \frac{\omega}{c}(d-d')j^k \left[ J_k\left(\frac{d\omega}{c}\right) - jJ'_m\left(\frac{d\omega}{c}\right) \right] \quad (18)$$

Inspection of equation (18) reveals that it is a more "well-behaved" function of frequency than is the function of equation (10). That is, the function $f_k$ never goes to zero, because none of the zeros of $J_k$ coincides with any zero of $J'_k$.

Of course, the transfer functions represented by the reciprocals of the expressions in equations (10) and (18) are not readily recognized as transfer functions of elementary phase-shift circuits. However, by employing a least-squares network-synthesis routine on a phase-shift network with a moderate number of poles, it is possible to obtain a circuit whose transfer function closely approximates the reciprocal of the expression of equation (18) throughout a fairly wide band. For narrower bands, it is also possible to approximate the transfer function given by the reciprocal of the expression in equation (10).

The system described in the foregoing discussion is a powerful monitoring device. It gives direction and temporal-frequency information on many signals simultaneously. However, those skilled in the art will recognize that the arrangement described above is merely examplary, and different types of individual elements can be employed. For example, the broader aspects of the invention can be practiced in a system in which the second transform device performs only spatial, not temporal, transformation. Of course, frequency discrimination would not be provided in such a system, but the direction information would still be produced. Additionally, it is not necessary that a Butler matrix be employed for the initial spatial Fourier transformation. Particularly in the lower frequency ranges, the Butler matrix 18 can be replaced with circuits for sampling the antenna-element outputs, converting them to digital form, and performing a fast Fourier transformation at a rapid rate. Rather than analog networks, then, the correction networks 22(k) might be devices for accumulating overlapped sequences of samples and convolving them with a discrete version of the impulse response corresponding to the transfer function of the correction network. Also, the specific antenna arrays illustrated above are not the only types of circular arrays that can be used with the present invention. Signals from other types of angularly symmetrical arrays, such as backscreen arrangements, can be employed.

Accordingly, the apparatus of the present invention that only extends the power of the two-dimensional compressive receiver and similar devices to circular arrays but also improves the direction-indicating ability of systems employing such circuits by eliminating the temporal-frequency dependence.

We claim:

1. A method of finding the direction of a signal source whose signals are sensed by a circular array of antenna elements, the method comprising the steps of:
   A. generating the spatial Fourier transformation of a signal ensemble having the phase relationship of the outputs of the circular array, thereby generating spatial-frequency components;
   B. generating corrected components by applying to each spatial-frequency component a correction function that differs substantially only in the absence of the physical-angle-dependent phase factor from the inverse of the antenna pattern resulting when the antenna elements radiate signals whose phases advance with element position at the spatial frequency associated with that spatial-frequency component; and
   C. performing a spatial Fourier transformation on the resulting ensemble of corrected components, the radial direction of the source of a given portion of the transform thereby being indicated by its spatial frequency.

2. A method as recited in claim 1 wherein the step of performing a spatial Fourier transformation on the corrected components comprises performing a two-dimensional Fourier transformation in space and time, thereby determining both direction and temporal frequency.

3. A device for finding the direction of a signal source whose signals are sensed by a circular array of antenna elements, the device comprising:
   A. a first spatial-Fourier-transform circuit for receiving as its inputs signals having the phase relationships of the outputs of the array and for generating as its outputs a spatial Fourier transformation of its inputs and thereby generating time-varying spatial-frequency components;
   B. correction circuits, connected to the first spatial-Fourier-transform circuit, for generating corrected components by applying to each spatial-frequency component a correction function that differs substantially only in the absence of the physical-angle-dependent phase factor from the inverse of the antenna pattern resulting when the antenna elements radiate signals whose phases advance with element position at the spatial frequency associated with that spatial-frequency component; and
   C. a second spatial-Fourier-transform circuit, connected to receive the corrected components from the correction circuits, for performing a spatial Fourier transformation on the corrected components, the radial direction of the source of a given portion of the transform thereby being indicated by its spatial frequency.

4. A device as recited in claim 3 wherein the second spatial-Fourier-transform circuit comprises a device for performing a two-dimensional Fourier transform in space and time on the corrected components and thereby also indicating the temporal frequencies of the received signals.

5. A device as recited in claim 4 wherein the second spatial-Fourier-transform circuit comprises a two-dimensional compressive receiver.

6. A device as recited in claim 5 wherein the first spatial-Fourier-transform circuit comprises a Butler matrix.

7. A device as recited in claim 4 wherein the first spatial-Fourier-transform circuit comprises a Butler matrix.

8. A device as recited in claim 3 wherein the first spatial-Fourier-transform circuit comprises a Butler matrix.

* * * * *